United States Patent
Liu et al.

(10) Patent No.: US 11,611,081 B2
(45) Date of Patent: Mar. 21, 2023

(54) LITHIUM ION SECONDARY BATTERY, BATTERY CORE, NEGATIVE ELECTRODE PLATE, AND APPARATUS

(71) Applicant: Contemporary Amperex Technology Co., Limited, Ningde (CN)

(72) Inventors: Xin Liu, Ningde (CN); Qisen Huang, Ningde (CN); Shiwen Wang, Ningde (CN); Xianghui Liu, Ningde (CN); Jia Peng, Ningde (CN); Mingling Li, Ningde (CN); Changliang Sheng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 346 days.

(21) Appl. No.: 17/128,090

(22) Filed: Dec. 19, 2020

(65) Prior Publication Data

US 2021/0151770 A1    May 20, 2021

Related U.S. Application Data

(63) Continuation of application No. PCT/CN2020/070449, filed on Jan. 6, 2020.

(30) Foreign Application Priority Data

May 31, 2019    (CN) .......................... 201910472635.4

(51) Int. Cl.
*H01M 4/66*    (2006.01)
*H01M 4/04*    (2006.01)
(Continued)

(52) U.S. Cl.
CPC ......... *H01M 4/667* (2013.01); *H01M 4/0404* (2013.01); *H01M 4/662* (2013.01);
(Continued)

(58) Field of Classification Search
CPC .... H01M 4/667; H01M 4/0404; H01M 4/662; H01M 4/663; H01M 4/668;
(Continued)

(56) References Cited

U.S. PATENT DOCUMENTS

2003/0194605 A1    10/2003    Fauteux et al.
2010/0112454 A1    5/2010    Visco et al.
(Continued)

FOREIGN PATENT DOCUMENTS

CN    1495942 A    5/2004
CN    1601801 A    3/2005
(Continued)

OTHER PUBLICATIONS

Reconsideration Report by Examiner before Appeal for Japan Application No. 2019-190773 , dated Jan. 19, 2022, 6 pages.
(Continued)

*Primary Examiner* — Gary D Harris
(74) *Attorney, Agent, or Firm* — East IP P.C.

(57)    ABSTRACT

The present disclosure provides a lithium ion secondary battery, a battery core, a negative electrode plate and an apparatus containing the lithium ion secondary battery. The lithium ion secondary battery includes a battery core and an electrolytic solution, the battery core including a positive electrode plate comprising a positive current collector and a positive active material layer, a separator, and a negative electrode plate comprising a negative current collector and a negative active material layer, wherein the positive current collector and/or the negative current collector are a composite current collector, the composite current collector comprises a polymer-based support layer and a conductive layer disposed on at least one surface of the support layer, and the composite current collector has a thermal conduc-
(Continued)

tivity in a range of 0.01 W/(m·K) to 10 W/(m·K), preferably in a range of 0.1 W/(m·K) to 2 W/(m·K).

11 Claims, 4 Drawing Sheets

(51) Int. Cl.
  *H01M 10/0525* (2010.01)
  *H01M 4/02* (2006.01)
(52) U.S. Cl.
  CPC ........... *H01M 4/663* (2013.01); *H01M 4/668* (2013.01); *H01M 10/0525* (2013.01); *H01M 2004/027* (2013.01)
(58) Field of Classification Search
  CPC ....... H01M 10/0525; H01M 2004/027; H01M 2300/0028; H01M 4/661; H01M 10/0569; H01M 10/052; H01M 10/615; H01M 10/654; H01M 10/651; Y02E 60/10
  USPC ......................................................... 429/520
  See application file for complete search history.

(56) References Cited

U.S. PATENT DOCUMENTS

| | | | |
|---|---|---|---|
| 2015/0303521 A1 | 10/2015 | Sasaki et al. | |
| 2015/0318555 A1 | 11/2015 | Oku et al. | |
| 2018/0301709 A1 | 10/2018 | Qiu | |
| 2018/0181823 A1* | 11/2018 | Qui | C01B 21/06 429/520 |
| 2021/0143440 A1* | 5/2021 | Liu | H01M 4/5825 |

FOREIGN PATENT DOCUMENTS

| | | |
|---|---|---|
| CN | 1906782 A | 1/2007 |
| CN | 101510625 A | 8/2009 |
| CN | 101803074 A | 8/2010 |
| CN | 101828293 A | 9/2010 |
| CN | 102037592 A | 4/2011 |
| CN | 104051784 A | 9/2014 |
| CN | 104157846 A | 11/2014 |
| CN | 104604003 A | 5/2015 |
| CN | 105742566 A | 7/2016 |
| CN | 105789611 A | 7/2016 |
| CN | 106298274 A | 1/2017 |
| CN | 106654285 A | 5/2017 |
| CN | 106785230 A | 5/2017 |
| CN | 107123812 A | 9/2017 |
| CN | 108258249 A | 7/2018 |
| CN | 108832134 A | 11/2018 |
| CN | 109119686 A | 1/2019 |
| CN | 109742436 A | 5/2019 |
| CN | 109786755 A | 5/2019 |
| EP | 3113273 A1 | 1/2017 |
| EP | 3509145 A1 | 7/2019 |
| JP | 1998112322 A | 10/1996 |
| JP | 1998112323 A | 10/1996 |
| JP | H09213338 A | 8/1997 |
| JP | 1999102711 A | 9/1997 |
| JP | 1997283149 A | 10/1997 |
| JP | H1197030 A | 4/1999 |
| JP | 2001313037 A | 11/2001 |
| JP | 2002203562 A | 7/2002 |
| JP | 2004273132 A | 9/2004 |
| JP | 2009064767 A | 3/2009 |
| JP | 2009099480 A | 5/2009 |
| JP | 2010040488 A | 2/2010 |
| JP | 2010040489 A | 2/2010 |
| JP | 2010118258 A | 5/2010 |
| JP | 2012155974 A | 8/2012 |
| JP | 2013026041 A | 2/2013 |
| JP | 2014080871 A | 5/2014 |
| JP | 2014522549 A | 9/2014 |
| JP | 2016134241 A | 7/2016 |
| JP | 2017016879 A | 1/2017 |
| JP | 2018181451 A | 11/2018 |
| JP | 2018181796 A | 11/2018 |
| JP | 2018181823 A | 11/2018 |
| KR | 20040010259 A | 1/2004 |
| KR | 20170003393 A | 1/2017 |
| KR | 20180116096 A | 10/2018 |
| WO | 0215302 A2 | 2/2002 |
| WO | 2012127561 A1 | 9/2012 |
| WO | WO2014034758 A1 | 3/2014 |
| WO | 2017120594 A2 | 7/2017 |
| WO | 2018062046 A1 | 4/2018 |
| WO | 2018147137 A1 | 8/2018 |

OTHER PUBLICATIONS

Chinese Office Action in Application No. 201910472635.4, dated Oct. 10, 2020.
International Search Report for PCT/CN2020/070449.
Japanese Office Action in Application No. 2019-190773, dated Oct. 10, 2020.
The Decision of Refusal for Japanese Application No. 2019-190773, dated Jul. 20, 2021, 6 pages.
The First Office Action for Japanese Application No. 2020-566300, dated Oct. 18, 2021, 8 pages.
The Decision of Refusal for Japanese Application No. 2020-566300, dated Mar. 7, 2022, 6 pages.
The First Office Action for Chinese Application No. 201910473216.2, dated Aug. 26, 2020, 19 pages.
The Notice of Allowance for Chinese Application No. 201910473216.2, dated Nov. 12, 2020, 6 pages.
The First Office Action for Indian Application No. 202017054485, dated Jan. 5, 2022, 6 pages.
The International Search Report for Application No. PCT/CN2019/090407, dated Mar. 9, 2020, 11 pages.
The EESR for European Application No. 19931444.4, dated Oct. 4, 2021, 9 pages.
The First Office Action for European Application No. 19931444.4, dated Feb. 22, 2022, 4 pages.
The Second Office Action for European Application No. 19931444.4, dated May 30, 2022, 5 pages.
Sang Woo Kim and Kuk Young Cho; Current Collectors for Flexible Lithium Ion Batteries: A Review of Materials; Journal of Electrochemical Science and Technology; J. Electrochem. Sci. Technol. 6(1), 10-15 (2015).
Research Progress of Flexible Supercapacitors; Power Capacitor & Reactive Power Compensation; vol. 37, No. 5: 0078-0082 Oct. 2016.
The First Non-Final Office Action for U.S. Appl. No. 17/123,268, dated Apr. 15, 2021, 17 pages.
The First Final Office Action for U.S. Appl. No. 17/123,268, dated Jul. 22, 2021, 7 pages.
The First Advisory Action for U.S. Appl. No. 17/123,268, dated Oct. 22, 2021, 5 pages.
The Second Non-Final Office Action for U.S. Appl. No. 17/123,268, dated Mar. 3, 2022, 13 pages.
The Second Final Office Action for U.S. Appl. No. 17/123,268, dated Jun. 23, 2022, 17 pages.
The Second Advisory Action for U.S. Appl. No. 17/123,268, dated Aug. 24, 2022, 5 pages.
The extended European search report for EP Application No. 20812892.6, dated Aug. 4, 2021, 8 pages.
The decision of Refusal of Japanese Patent Application No. 2019-190773,dated Jul. 9, 2021, 6 pages.
The Second Office Action for Japanese Application No. 2019-190773, dated Oct. 18, 2022, 51 pages.
Nature of various substances: Nature of non-metallic solid, plastics, Internet archive., dated Oct. 18, 2022, 6 pages.
The Second Office Action for CN Application No. 201910472635.4, dated Apr. 15, 2021, 13 pages.
The First Examination Report for EP Application No. 20812892.6, dated May 9, 2022, 5 pages.

(56) References Cited

OTHER PUBLICATIONS

The First Office Action for IN Application No. 202017054339, dated Feb. 16, 2021, 6 pages.
The First Office Action for Korean Application No. 10-2020-7034008, dated Nov. 2, 2022, 19 pages.
The First Office Action for Korean Application No. 10-2020-7034296, dated Nov. 2, 2022, 17 pages.

\* cited by examiner ional Application No. PCT/CN2020/070449, filed on Jan. 6, 2020,
LITHIUM ION SECONDARY BATTERY, BATTERY CORE, NEGATIVE ELECTRODE PLATE, AND APPARATUS The present invention is a continuation of International Application No. PCT/CN2020/070449, filed on Jan. 6, 2020, which claims priority to Chinese Patent Invention No. 201910472635.4, filed on May 31, 2019, titled with "Lithium Ion Secondary Battery, Battery core, and Negative Electrode Plate", both of which are hereby incorporated by reference in their entireties.

TECHNICAL FIELD

The present disclosure relates to the technical field of secondary batteries, and particularly, relates to a lithium ion secondary battery, a battery core, a negative electrode plate, and an apparatus.

BACKGROUND

Lithium ion secondary batteries have been widely applied due to their advantages such as excellent charge and discharge performance, no memory effect and being environmentally friendly. However, the lithium ion secondary batteries usually have poor performances under low temperature conditions. In severe cases, lithium precipitation may occur on a negative electrode, which significantly affects electrochemical performance and safety performance of the lithium ion secondary batteries.

SUMMARY

In a first aspect, the present disclosure provides a lithium ion secondary battery including a battery core and an electrolytic solution, the battery core including a positive electrode plate comprising a positive current collector and a positive active material layer disposed on a surface of the positive current collector, a separator, and a negative electrode plate comprising a negative current collector and a negative active material layer disposed on a surface of the negative current collector, wherein the positive current collector and/or the negative current collector are a composite current collector, the composite current collector includes a polymer-based support layer and a conductive layer disposed on at least one surface of the support layer, and the composite current collector has a thermal conductivity in a range of 0.01 W/(m·K) to 10 W/(m·K), preferably in a range of 0.1 W/(m·K) to 2 W/(m·K).

In a second aspect, the present disclosure provides a battery core for a lithium ion secondary battery, including a positive electrode plate comprising a positive current collector and a positive active material layer disposed on a surface of the positive current collector, a separator, and a negative electrode plate comprising a negative current collector and a negative active material layer disposed on a surface of the negative current collector, wherein the positive current collector and/or the negative current collector are a composite current collector, the composite current collector includes a polymer-based support layer and a conductive layer disposed on at least one surface of the support layer, and the composite current collector has a thermal conductivity in a range of 0.01 W/(m·K) to 10 W/(m·K), preferably in a range of 0.1 W/(m·K) to 2 W/(m·K).

In a third aspect, the present disclosure provides a negative electrode plate for a lithium ion secondary battery, including a negative current collector and a negative active material layer disposed on a surface of the negative current collector wherein the negative current collector is a composite current collector, the composite current collector includes a polymer-based support layer and a conductive layer disposed on at least one surface of the support layer, and the composite current collector has a thermal conductivity in a range of 0.01 W/(m·K) to 10 W/(m·K), preferably in a range of 0.1 W/(m·K) to 2 W/(m·K).

In a fourth aspect, the present disclosure provides an apparatus, which includes the lithium ion secondary battery according to the first aspect of the present disclosure.

The lithium ion secondary battery according to the present disclosure adopts a composite current collector, the composite current collector including a polymer-based support layer and a conductive layer disposed on at least one surface of the support layer. Surprisingly, the thermal conductivity of the composite current collector is smaller than that of a conventional metal current collector. For example, an aluminum foil current collector has a thermal conductivity of 218 W/(m·K); and a copper foil current collector has a thermal conductivity of 381 W/(m·K). The battery adopting such a composite current collector is less affected by the ambient temperature when operating in a low temperature environment, and the heat generated by the battery itself is not dissipated rapidly, such that the lithium ion secondary battery in the low temperature environment can maintain a suitable working temperature inside the battery core. In this way, a low temperature dynamic performance of the battery is improved, and thus the battery has good electrochemical performance and low temperature safety performance. In addition, the composite current collector has also a lower weight than the conventional metal current collector, thereby increasing a weight energy density of the battery.

The apparatus of the present disclosure includes the lithium ion secondary battery according to the first aspect of the present disclosure, and thus has at least the same advantages as the lithium ion secondary battery.

BRIEF DESCRIPTION OF DRAWINGS

In order to clearly illustrate technical solutions of embodiments of the present disclosure, drawings used in the embodiments of the present disclosure will be briefly described below, and those skilled in the related art can also obtain other drawing on basis of these drawings without any creative labor.

DESCRIPTION OF EMBODIMENTS

Figure 1:
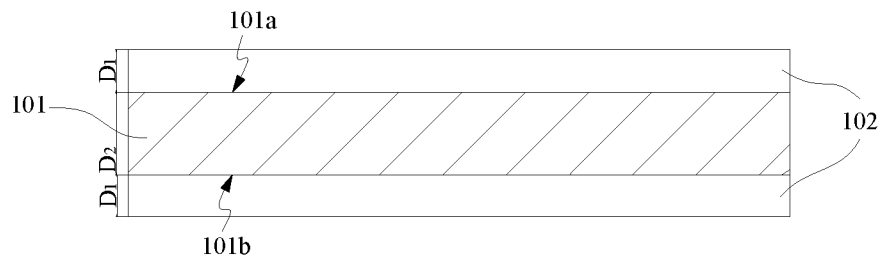
FIG. 1 is a structural schematic diagram of a composite current collector according to an embodiment of the present disclosure.

In order to clearly explain the purposes, the technical solutions and the beneficial technical effects of the present disclosure, the present disclosure will be described in detail below with reference to the embodiments. It should be understood that the embodiments described herein are merely used to illustrate the present disclosure, but not intended to limit the present disclosure.

For the sake of brevity, the present disclosure explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above is not intended to describe all disclosed embodiments or implementations. The exemplary embodiments are described in details as below. Throughout the present disclosure, a series of embodiments provide a guidance such that these embodiments can be used in various combinations. In the present disclosure, merely the representative embodiments are presented and should not be construed as to be exhaustive.

Lithium Ion Secondary Battery

The present disclosure provides a lithium ion secondary battery, including a battery core and an electrolytic solution. The battery core and the electrolytic solution can be sealed in an outer packaging.

The present disclosure further provides a battery core for a lithium ion secondary battery. The battery core includes a positive electrode plate, a separator, and a negative electrode plate. For example, the battery core may be formed by stacking or winding the positive electrode plate, the separator, and the negative electrode plate in which the separator is disposed between the positive electrode plate and the negative electrode plate for separation.

The positive electrode plate includes a positive current collector and a positive active material layer disposed on a surface of the positive current collector, and the positive active material layer includes a positive active material. The negative electrode plate includes a negative current collector and a negative active material layer disposed on a surface of the negative current collector, and the negative active material layer includes a negative active material. The lithium ion secondary battery can be charged and discharged by reversible intercalation and de-intercalation of lithium ions between the positive active material and the negative active material.

The positive current collector and/or the negative current collector of the battery core can be a composite current collector.

FIG. 1 is a structural schematic diagram of a composite current collector 10 according to an embodiment of the present disclosure. Referring to FIG. 1, the composite current collector 10 includes a polymer-based support layer 101 and a conductive layer 102 that are stacked. The support layer 101 has, in its thickness direction, a first surface 101a and a second surface 101b that are opposite to each other. The conductive layer 102 is disposed on the first surface 101a and the second surface 101b of the support layer 101. It can be understood that the conductive layer 102 can also be disposed on the first surface 101a of the support layer 101, or the second surface 101b of the support layer 101.

In the lithium ion secondary battery according to the present disclosure, the positive current collector and/or the negative current collector of the battery core are the composite current collector 10, the composite current collector 10 includes the support layer 101 and the conductive layer 102 disposed on at least one surface of the support layer 101, and the composite current collector 10 has a thermal conductivity of 0.01 W/(m·K) to 10 W/(m·K). Compared with a conventional metal current collector, the composite current collector 10 has a significantly reduced thermal conductivity. Therefore, the battery adopting such a composite current collector is less affected by the ambient temperature when operating in a low temperature environment, and the heat generated by the battery itself is not dissipated rapidly, such that the lithium ion secondary battery in the low temperature environment can maintain a suitable working temperature inside the battery core. In this way, the dynamic performance at low temperature of the battery can be improved, and thus the battery has good electrochemical performance and safety performance at low temperature.

The composite current collector 10 having a thermal conductivity of smaller than or equal to 10 W/(m·K) ensures that the battery has good dynamic performance at low temperature, thereby effectively improving the electrochemical performance of the battery at low temperature and effectively inhibiting the lithium precipitation occurred at low temperature on the negative electrode. The composite current collector 10 having a thermal conductivity of greater than or equal to 0.01 W/(m·K) is conducive to allowing the support layer 101 to have a small thickness, thereby improving the volume energy density and the weight energy density of the battery. Preferably, the thermal conductivity of the composite current collector 10 is in a range from 0.01 W/(m·K) to 2 W/(m·K).

The thermal conductivity of the composite current collector 10 is influenced by the following factors: a thickness $D_1$ of the conductive layer 102, a material of the conductive layer 102, a thickness $D_2$ of the support layer 101, a material of the support layer 101, processing conditions for preparing the conductive layer 102 (for example, a deposition rate, a deposition temperature, a cooling rate, and the like, when the conductive layer 102 is prepared by a deposition process), a bonding force between the conductive layer 102 and the support layer 101, and the like. The thermal conductivity of the composite current collector 10 can be improved by adjusting one or more of the above-mentioned factors.

The support layer 101 of the composite current collector 10 can provide the conductive layer 102 with effective support, and guarantee an overall strength of the composite current collector 10. Thus, the conductive layer 102 has a greatly reduced thickness, and is not easy to break, compared with the conventional metal current collector such as an aluminum foil and a copper foil. Compared with the conventional metal current collector, the conductive layer 102 has a significantly reduced thickness and the support layer 101 has a smaller density than metal, so that the weight of the battery core and the lithium ion secondary battery can be reduced while maintaining good conductive and current collecting performances of the conductive layer 102, thereby increasing the energy density of the battery.

In some embodiments, the thickness $D_1$ of the conductive layer 102 satisfies 30 nm≤$D_1$≤3 μm. The thickness $D_1$ of the conductive layer 102 within the appropriate range enables the conductive layer 102 to have high conductive and current collecting performances, which can reduce impedance of the lithium ion secondary battery and reduce polarization of the battery, thereby improving the electrochemical performances of the lithium ion secondary battery. In this way, the lithium ion secondary battery has high rate performance and cycle performance. In the meantime, the conductive layer 102 is not easy to break during processing and use, such that the composite current collector 10 has higher mechanical stability and operating stability, and the lithium ion secondary battery has a longer service life.

The conductive layer 102 having a relatively low thickness $D_1$ enables the conductive layer 102 to form less burrs in an abnormal case of the lithium ion secondary battery such as nailing penetration, thereby reducing the risk of the metal burrs and the electrode being contacted and thereby further improving the safety performance of the lithium ion secondary battery.

In addition, disposing the conductive layer 102 having a smaller thickness on the surface of the support layer 101 can significantly reduce the weight of the composite current collector 10, which is conducive to reducing the weight of the lithium ion secondary battery and significantly improving the energy density of the lithium ion secondary battery.

In some embodiments, the thickness $D_1$ of the conductive layer 102 can be smaller than or equal to 3 μm, 2.5 μm, 2 μm, 1.8 μm, 1.5 μm, 1.2 μm, 1 μm, 900 nm, 750 nm, 450 nm, 250 nm, or 100 nm; and the thickness $D_1$ of the conductive layer 102 can be further larger than or equal to 30 nm, 80 nm, 100 nm, 150 nm, 300 nm, 400 nm, 600 nm, 800 nm, 1 μm, or 1.6 μm. Preferably, the thickness $D_1$ of the conductive layer 102 satisfies 300 nm≤$D_1$≤2 μm, more preferably 500 nm≤$D_1$≤1.5 μm, especially preferably 800 nm≤$D_1$≤1.2 μm.

The "thickness $D_1$ of the conductive layer 102" is referred to a thickness of the conductive layer 102 on one surface of the support layer 101.

The conductive layer 102 can include one or more of a metallic material, a carbon-based conductive material, and a conductive polymer material.

In some embodiments, the metallic material can includes one or more of aluminum, aluminum alloy, copper, copper alloy, nickel, nickel alloy, iron, iron alloy, titanium, titanium alloy, silver, and silver alloy, for example one or more of aluminum, copper, nickel, iron, titanium, silver, nickel-copper alloy and aluminum-zirconium alloy.

In some embodiments, the carbon-based material can include one or more of graphite, superconductive carbon, acetylene black, carbon black, ketjen black, carbon dots, carbon nanotubes, graphene, and carbon nanofiber.

In some embodiments, the conductive polymer material can include one or more of polysulfide nitride, an aliphatic conjugated polymer, an aromatic cyclic conjugated polymer, or an aromatic heterocyclic conjugated polymer. For example, the conductive polymer material can comprise one or more of polyacetylene, polyphenylene, polypyrrole, polyaniline, polythiophene, and polypyridine. It is also possible to intensify the electron delocalization of the conductive polymer material by doping modification, thereby improving the electrical conductivity of the conductive polymer material.

In some embodiments, when the composite current collector 10 is used as a positive current collector, the conductive layer 102 preferably includes aluminum or aluminum alloy, and the element aluminum is present in the aluminum alloy in a weight percentage of greater than or equal to 80 wt %, preferably greater than or equal to 90 wt %. In some embodiments, when the composite current collector 10 is used as a negative current collector, the conductive layer 102 preferably includes copper or copper alloy, and the element copper is present in the copper alloy in a weight percentage of greater than or equal to 80 wt %, preferably greater than or equal to 90 wt %.

In some embodiments, the conductive layer 102 has a volume resistivity smaller than or equal to $8.0 \times 10^{-8}$ Ω·m, which is conducive to making the conductive layer 102 to have good conductive and current collecting performances, thereby improving the rate performance and cycle performance of the lithium ion secondary battery.

Further, when the composite current collector 10 is used as the positive current collector, the volume resistivity of the conductive layer 102 is preferably in a range of $3.2 \times 10^{-8}$ Ω·m to $7.8 \times 10^{-8}$ Ω·m. When the composite current collector 10 is used as the negative current collector, the volume resistivity of the conductive layer 102 is preferably in a range of $1.65 \times 10^{-8}$ Ω·m to $3.3 \times 10^{-8}$ Ω·m. In this way, the lithium ion secondary battery has reduced impedance and reduced polarization while the conductive layer 102 has high conductive and current collecting performances, such that the lithium ion secondary battery has high rate performance and cycle performance both. Particularly, the lithium ion secondary battery adopting the composite current collector can be improved in terms of the dynamic performance at low temperature condition, thereby ensuring that the battery has good electrochemical performances at low temperature such as rate performance at low temperature.

In some embodiments, the thickness $D_2$ of the support layer 101 preferably satisfies 1 μm≤$D_2$≤30 μm. The support layer 101 having the thickness $D_2$ within the above range may produce the following beneficial effects. On the one hand, the support layer 101 has better exert heat preservation and storage to on the battery core and the lithium ion secondary battery, thereby improving the performance of the lithium ion secondary battery at low temperature. On the other hand, the support layer 101 has high mechanical strength and thus is not easy to break during processing and use so that the support layer 101 can provide the conductive layer 102 with good supporting and protective effects, thereby improving the mechanical stability and operating stability of the composite current collector 10. In addition, the support layer 101 can also reduce the volume and weight of the lithium ion secondary battery, thereby increasing the volume energy density and weight energy density of the lithium ion secondary battery.

In some embodiments, the thickness $D_2$ of the support layer 101 can be smaller than or equal to 30 μm, 25 μm, 20 μm, 18 μm, 15 μm, 12 μm, 10 μm, or 8 μm; and the thickness D2 of the support layer 101 further can be greater than or equal to 16 μm, 9 μm, 7 μm, 6 μm, 5 μm, 4 μm, 3 μm, 2 μm, 1.5 μm, or 1 μm. Preferably, the thickness $D_2$ of the support layer 101 satisfies 1 nm≤$D_1$≤20 μm. Preferably, the thickness $D_2$ of the support layer 101 satisfies 1μ≤$D_2$≤15 μm. Preferably, the thickness $D_2$ of the support layer 101 satisfies 1 μm≤$D_2$≤10 μm. Preferably, the thickness $D_2$ of the support layer 101 further satisfies 1μ≤$D_2$≤8 μm. Preferably the thickness $D_2$ of the support layer 101 further satisfies 2 μm≤$D_2$≤8 μm.

In some embodiments, preferably, the support layer 101 has a Young's modulus E satisfying E≥2 GPa. The support layer 101 having above Young's modulus E enables the support layer 101 to have a certain rigidity, which not only makes the support layer 101 to exert the sufficient support effect on the conductive layer 102, ensures the overall strength of the composite current collector 10, but also prevents the support layer 101 from being excessively extended or deformed during the processing of the composite current collector 10 and effectively avoid the support layer 101 and the conductive layer 102 from breaking. In the meanwhile, with the support layer 101, the bonding force between the support layer 101 and the conductive layer 102 is greater, the conductive layer 102 is not easy to detach and the mechanical stability and operating stability of the composite current collector 10 are enhanced, thereby improving the performance of the lithium ion secondary battery.

Further, the Young's modulus E of the support layer 101 satisfies 2 GPa≤E≤20 GPa, for example, 2 GPa, 3 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa. The support layer 101 having above Young's modulus E enables the support layer 101 to have a certain rigidity and a suitable tenacity, thereby ensuring that the support layer 101 and the composite current collector 10 containing the same have a certain flexibility of during winding.

The support layer 101 includes one or more of polymer materials. In some embodiments, the polymer materials may include one or more of polyamides, polyimides, polyesters, polyolefins, polyacetylenes, siloxane-based polymers, polyethers, polyalcohols, polysulfones, polysaccharides, amino acid-based polymers, polysulfurnitrides, aromatic cyclic polymers, aromatic heterocyclic polymers, epoxy resins, phenolic resins, derivatives thereof, crosslinks thereof, and copolymers thereof.

In some embodiments, the polymer materials may include one or more of polycaprolactam (commonly known as nylon 6), polyhexamethylene adipamide (commonly known as nylon 66), polyparaphenylene terephthalamide (PPTA), poly (m-phenylene isophthalamide) (PMIA), polyethylene terephthalate (PET), polybutylene terephthalate (PBT), poly (ethylene naphthalate) (PEN), polycarbonate (PC), polyethylene (PE), polypropylene (PP), poly(propylene ethylene) (PPE), polyvinyl alcohol (PVA), polystyrene (PS), polyvinyl chloride (PVC), polyvinylidene fluoride (PVDF), polytetrafluoroethylene (PTFE), poly(sodium styrenesulfonate) (PSS), silicone rubber, polyoxymethylene (POM), polyphenylene oxide (PPO), polyphenylene sulfide (PPS), polyethylene glycol (PEG), cellulose, starch, protein, polyphenylene, polypyrrole (PPy), polyaniline (PAN), polythiophene (PT), polypyridine (PPY), acrylonitrile-butadiene-styrene copolymer (ABS), derivatives thereof, crosslinks thereof, and copolymers thereof.

In some embodiments, the support layer 101 further includes an additive, and the additive may include one or more of a metallic material and an inorganic non-metallic material.

In some embodiments, the metallic material additive is, for example, aluminum, aluminum alloy, copper, copper alloy, nickel, nickel alloy, titanium, titanium alloy, iron, iron alloy, silver, and silver alloy.

In some embodiments, the inorganic non-metallic material additive is, for example, one or more of a carbon-based material, aluminum oxide, silicon oxide, silicon nitride, silicon carbide, boron nitride, silicate and titanium oxide; or for example, one or more of a glass material, a ceramic material and a ceramic composite material. The aforementioned carbon-based material is, for example, one or more of graphite, superconductive carbon, acetylene black, carbon black, ketjen black, carbon dots, carbon nanotubes, graphene, and carbon nanofiber.

In some embodiments, the additive can further comprise a carbon-based material coated with a metallic material, such as one or more of nickel-coated graphite powder or nickel-coated carbon fiber.

In some preferred embodiments, the support layer 101 can be made of one or more of an insulating polymer material and an insulating polymer-based composite material. Such a support layer 101 has higher volume resistivity, which is conducive to improving the safety performance of the lithium ion secondary battery.

Preferably, the support layer 101 includes one or more of polyethylene terephthalate (PET), polybutylene terephthalate (PBT), polyethylene naphthalate (PEN), poly(sodium styrenesulfonate) (PSS), and polyimides (PI).

Figure 2:
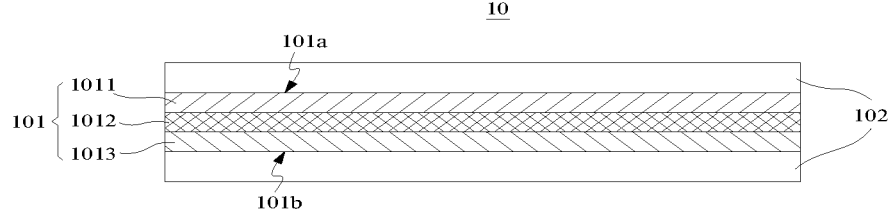
FIG. 2 is a structural schematic diagram of a composite current collector according to another embodiment of the present disclosure.

The support layer 101 can have a single layer structure, or a composite layer structure having two or more layers, such as two layers, three layers, four layers, and the like. FIG. 2 is a structural schematic diagram of a composite current collector 10 with a support layer 101 having a composite structure according to another embodiment of the present disclosure. Referring to FIG. 2, the support layer 101 has a composite layer structure formed by stacking a first sub-layer 1011, a second sub-layer 1012 and a third sub-layer 1013. The support layer 101 having the composite layer structure has a first surface 101a and a second surface 101b that are opposite to each other, and the conductive layers 102 are stacked on the first surface 101a and the second surface 101b of the support layer 101. It is also possible that the conductive layer 102 is disposed only on the first surface 101a of the support layer 101, or only on the second surface 101b of the support layer 101.

When the support layer 101 is in a composite layer structure having two or more layers, the two or more layers each can be made of the same material or different materials.

Figure 3:
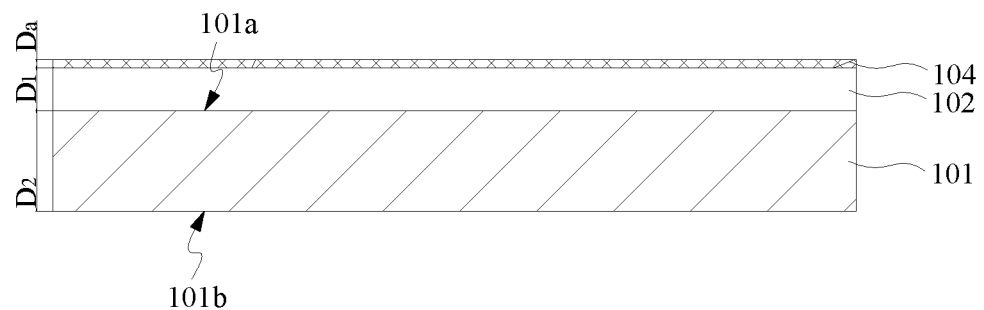
FIG. 3 is a structural schematic diagram of a composite current collector according to yet another embodiment of the present disclosure.
Figure 4:
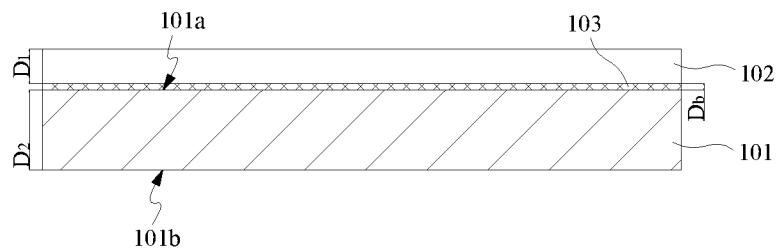
FIG. 4 is a structural schematic diagram of a composite current collector according to yet another embodiment of the present disclosure.
Figure 5:
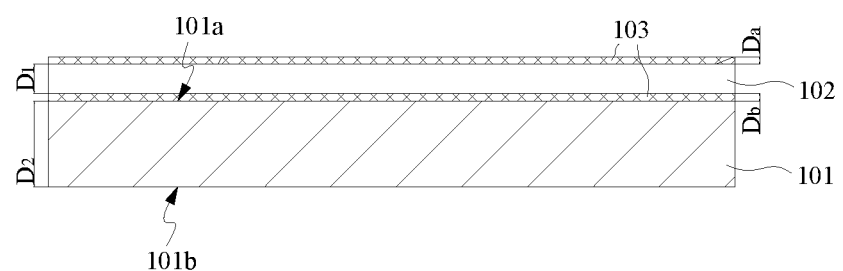
FIG. 5 is a structural schematic diagram of a composite current collector according to yet another embodiment of the present disclosure.

In some embodiments, the composite current collector 10 can further include a protective layer. Referring to FIG. 3 to FIG. 5, the protective layer may include a first protective layer 103 disposed between the conductive layer 102 and the support layer 101; and/or a second protective layer 104 disposed on the surface of the conductive layer 102 facing away from the support layer 101. The protective layer can protect the conductive layer 102 from chemical corrosion, mechanical damage, or other damage, and make sure that the composite current collector 10 has high operating stability and long service life, thereby improving the safety performance and electrochemical performance of the lithium ion secondary battery. In addition, the protective layer can also enhance the strength of the composite current collector 10.

It can be understood that FIG. 3 to FIG. 5 illustrate that merely one surface of the support layer 101 is provided with the conductive layer 102 and the protective layer. However, in other embodiments, the two opposite surfaces of the conductive layer 102 each can be provided with the conductive layer 102. In this case, it is possible to provide the first protective layer 103 between anyone or two of the conductive layers 102 and the support layer 101, and/or it is possible to dispose the second protective layer 104 on the surface of any one or two of the conductive layers 102 facing away from the support layer 101.

The first protective layer 103 and the second protective layer 104 independently include one or more of metal, metal oxide, and conductive carbon. The protective layer made of the metallic material is a metal protective layer, and the protective layer made of the metal oxide material is a metal oxide protective layer The metal is, for instance, one or more of nickel, chromium, nickel-based alloy, and copper-based alloy. The aforementioned nickel-based alloy is an alloy composed of pure nickel as a matrix, and one or more other elements, and nickel-chromium alloy is preferred. The nickel-chromium alloy is an alloy of metal nickel and metal chromium. Optionally, the nickel-chromium alloy has a weight ratio of nickel to chromium of 1:99 to 99:1, such as 9:1. The aforementioned copper-based alloy is an alloy composed of pure copper as a matrix, and one or more other elements, and nickel-copper alloy is preferred. Optionally, the nickel-copper alloy has a weight ratio of nickel to copper of 1:99 to 99:1, such as 9:1.

The above metal oxide is, for example, one or more of aluminum oxide, cobalt oxide, chromium oxide, and nickel oxide.

The conductive carbon is, for example, one or more of graphite, superconductive carbon, acetylene black, carbon black, ketjen black, carbon dots, carbon nanotubes, graphene, and carbon nanofiber. Further, the conductive carbon is one or more of carbon black, carbon nanotubes, acetylene black, and graphene.

In some examples, referring to FIG. 3, the composite current collector 10 includes the support layer 101, the conductive layer 102, and the protective layer 103 which are disposed in a stacked manner. The support layer 101 has the first surface 101a and the second surface 101b that are opposite to each other in the thickness direction of the support layer 101, the conductive layer 102 is stacked on at least one of the first surface 101a and the second surface 101b of the support layer 101, and the second protective layer 104 is stacked on the surface of the conductive layer 102 facing away from the support layer 101.

The second protective layer 104, which is simply referred to as an upper protective layer hereinafter, protects the conductive layer 102 from chemical corrosion and mechanical damage, and also modifies the interface between the composite current collector 10 and the active material layer, thereby increasing the bonding force between the composite current collector 10 and the active material layer.

In some embodiments, the second protective layer 104 is preferably at least one of the metal protective layer or the metal oxide protective layer. The metal oxide protective layer and the metal protective layer have high mechanical strength, high corrosion resistance, and large specific surface area, which can better protect the conductive layer 102 from the chemical corrosion or mechanical damage, and can further increase the interface bonding force between the conductive layer 102 and an active material layer, thereby improving the performances of the lithium ion secondary battery.

Further, when the composite current collector 10 is used as the positive current collector, it is preferred that the second protective layer 104 is the metallic protective layer, for example, aluminum oxide, chrome oxide, nickel oxide, chromium oxide, and the like. The metal oxide protective layer has greater hardness and mechanical strength, larger specific surface area, and better corrosion resistance, which can better protect the conductive layer 102 and improve the safety performance of the battery during nailing.

Further, when the composite current collector 10 is used as the negative current collector, it is preferred that the second protective layer 104 is the metallic protective layer. The metallic protective layer may increase the conductivity of the composite current collector 10, and reduce the polarization of the battery, thereby lowering the risk of lithium precipitation and improving the cycle and safety performances of the lithium ion secondary battery. In an embodiment, the second protective layer 104 is a two-layered protective layer, i.e., a composite structure including one metallic protective layer and one metal oxide protective layer. Preferably the metallic protective layer is disposed on the surface of the conductive layer 102 facing away from the support layer 101 and the metal oxide protective layer is disposed on a surface of the metallic protective layer facing away from the support layer 101. In this way, the conductivity and corrosion resistance of the negative current collector, and the interface between the conductive layer 102 and the negative active material layer can be improved both, thereby obtaining the negative current collector having better overall performances.

In some other examples, referring to FIG. 4, the composite current collector 10 includes the support layer 101, the conductive layer 102 and the protective layer 103 that are stacked. The support layer 101, in a thickness direction thereof, has the first surface 101a and the second surface 101b that are opposite to each other, the conductive layer 102 is stacked on at least one of the first surface 101a and the second surface 101b of the support layer 101, and the first protective layer 103 is stacked between the conductive layer 102 and the support layer 101.

The first protective layer 103, which is also referred to as a lower protective layer, protects the conductive layer 102 from chemical corrosion and mechanical damage, and also increases the bonding force between the support layer 101 and the conductive layer 102, thereby preventing the detachment between the support layer 101 and the conductive layer 102 and improving the support and protective effect on the conductive layer 102.

Optionally, the first protective layer 103 is the metal oxide protective layer or the metal protective layer. The metal oxide protective layer and the metal protective layer have better corrosion resistance and larger specific surface area, and further increases the bonding force between the support layer 101 and the conductive layer 102. Therefore, the first protective layer 103 can provide the conductive layer 102 with better protective effect, and improve the performances of the lithium ion secondary battery. The metal oxide protective layer has greater hardness and better mechanical strength, and thus is more advantageous to improving the strength of the composite current collector 10.

When the composite current collector 10 is used as the positive current collector, the first protective layer 103 is the metal oxide protective layer.

When composite current collector 10 is used as the negative current collector, the first protective layer 103 is the metallic protective layer. Such a first protective layer 103 can protect the conductive layer 102 from the chemical corrosion or mechanical damage as well as increase the conductivity of the composite current collector 10, and reduce the polarization of the battery, thereby lowering the risk of lithium precipitation and improving the cycle and safety performances of the lithium ion secondary battery.

In some other examples, referring to FIG. 5, the composite current collector 10 includes the support layer 101, the conductive layer 102 and the protective layers 103 that are stacked. The support layer 101, in a thickness direction thereof, has the first surface 101a and the second surface 101b that are opposite to each other, the conductive layer 102 is stacked on at least one of the first surface 101a and the second surface 101b of the support layer 101, and the first protective layer 103 is stacked between the conductive layer 102 and the support layer 101 and the second protective layer 104 is stacked on a surface of the conductive layer 102 facing away from the support layer 101.

The protective layers being disposed on both surfaces of the conductive layer 102 can sufficiently protect the conductive layer 102, such that the composite current collector 10 can have higher overall performances.

It should be understood that the first protective layers 103 and the second protective layer 104 disposed on both surfaces of the conductive layer 102 can be made of the same material or different materials, and have the same or different thickness.

In some embodiments, when the composite current collector 10 includes the first protective layer 103, the first protective layer 103 has a thickness $D_b$ that satisfies 1 nm≤$D_b$≤200 nm, and $D_b$≤0.1$D_1$. In some embodiments, the thickness $D_b$ of the first protective layer 103 can be smaller than or equal to 200 nm, 180 nm, 150 nm, 120 nm, 100 nm, 80 nm, 60 nm, 55 nm, 50 nm, 45 nm, 40 nm, 30 nm, or 20 nm, and the thickness $D_b$ of the first protective layer 103 can be further greater than or equal to 1 nm, 2 nm, 5 nm, 8 nm, 10 nm, 12 nm, 15 nm, or 18 nm. Preferably, the thickness $D_b$ of the first protective layer 103 satisfies 5 nm≤$D_b$≤200 nm, and more preferably 10 nm≤$D_b$≤200 nm.

When thickness of the first protective layer 103 falls within an appropriate range, the first protective layer 103 has the protective effect on the conductive layer 102 and allows the lithium ion secondary battery to have higher energy density.

In some embodiment, when the composite current collector 10 includes the second protective layer 104, the second protective layer 104 has a thickness $D_a$ satisfying 1 nm≤$D_a$≤200 nm and $D_a$≤0.1$D_1$. In some embodiments, the thickness $D_a$ of the second protective layer 104 can be smaller than or equal to 200 nm, 180 nm, 150 nm, 120 nm, 100 nm, 80 nm, 60 nm, 55 nm, 50 nm, 45 nm, 40 nm, 30 nm, or 20 nm, and the thickness $D_a$ of the second protective layer 104 can be further greater than or equal to 1 nm, 2 nm, 5 nm, 8 nm, 10 nm, 12 nm, 15 nm, or 18 nm. Preferably, the thickness $D_a$ of the second protective layer 104 satisfies 5 nm≤$D_a$≤200 nm, and more preferably 10 nm≤$D_a$≤200 nm.

When thickness of the second protective layer 104 falls within an appropriate range, the second protective layer 104 has the protective effect on the conductive layer 102 and allows the lithium ion secondary battery to have higher energy density.

When both surfaces of the conductive layer 102 are provided with the protective layers, i.e., the composite current collector 10 includes the first protective layer 103 and the second protective layer 104, preferably $D_a$>$D_b$ is conducive to protecting the conductive layers 102 from the chemical corrosion or mechanical damage by synergistic effect of the first protective layer 103 and the second protective layer 104 and also is conducive to allowing the lithium ion secondary battery to have the higher energy density. More preferably, the first protective layer 103 and the second protective layer 104 can exert better cooperative protective effect when 0.5 $D_a$≤$D_b$≤0.8 $D_a$.

It should be understood that the presence or absence of the first protective layer 103 and the second protective layer 104 has an ignorable influence on the thermal conductivity of the composite current collector 10.

In some embodiments, preferably, the bonding force between the support layer 101 and the conductive layer 102 satisfies F≥100 N/m, and preferably F≥400 N/m, such that the detachment between the support layer 101 and the conductive layer 102 can be effectively prevented and the overall strength and stability can be enhanced, thereby improving the performances of the lithium ion secondary battery.

In the composite current collector 10 according to the present disclosure, the conductive layer 102 adopting the metallic material can be formed on the support layer 101 by at least one method of mechanical rolling, bonding, vapor deposition, electroless plating, or electroplating. The vapor deposition method or the electroplating method is preferred. The conductive layer 102 being formed on the support layer 101 by the vapor deposition method or the electroplating method is conducive to achieving a tighter bonding between the conductive layer 102 and the support layer 101.

The said vapor deposition method is physical vapor deposition. The physical vapor deposition is at least one of evaporation method and sputtering method. The evaporation method is at least one of vacuum evaporating, thermal evaporation deposition, and electron beam evaporation method (EBEM). The sputtering method is magnetron sputtering.

As an example, the conductive layer 102 is formed by mechanical rolling as follows: placing a metal foil on mechanical rollers and rolling the metal foil to have a predetermined thickness under a pressure of 20t to 40t; placing the metal foil onto the cleaned surface of the support layer 101 and placing them on the mechanical rollers; and rolling them until they are tightly bonded under a pressure of 30t to 50t.

The conductive layer 102 is formed by bonding as follows: placing a metal foil on mechanical rollers and rolling the metal foil to have a predetermined thickness under a pressure of 20t to 40t; coating the cleaned surface of the support layer 101 with a mixed solution of polyvinylidene fluoride (PVDF) and N-methylpyrrolidone (NMP); and finally, bonding the conductive layer 102 having the predetermined thickness to the surface of the support layer 101, following by drying, until they are tightly bonded.

The conductive layer 102 is formed by vacuum evaporation as follows: placing the surface-cleaned support layer 101 in a vacuum plating chamber, evaporating a high-purity metal wire in a metal evaporating chamber at a high temperature of 1300° C. to 2000° C., and depositing the evaporated metal on the support layer 101 after the evaporated metal passing through a cooling system in the vacuum plating chamber, so as to form a conductive layer 102.

The conductive layer 102 adopting the carbon-based conductive material can be formed on the support layer 101 by at least one method of mechanical rolling, bonding, vapor deposition, in-situ formation, and coating.

The conductive layer 102 adopting the conductive polymer material can be formed on the support layer 101 by at least one method of mechanical rolling, bonding, in-situ formation, and coating.

When the composite current collector 10 has a protective layer, the protective layer can be formed on the conductive layer 102 by at least one of vapor deposition method, in-situ formation method, and coating method. The vapor deposition method can be that as described above. The in-situ formation method is preferably an in-situ passivation method, i.e., a metal oxide passivation layer is formed in situ on a metal surface. The coating method is at least one of roll coating, extrusion coating, blade coating, and gravure coating.

Preferably, the protective layer is formed on the conductive layer 102 by at least one of the vapor deposition method and the in-situ formation method, thereby increasing the bonding force between the conductive layer 102 and the protective layer 103. Therefore, the protective layer 102 can better protect the negative current collector 10 and ensure the working performance of the negative current collector 10.

The composite current collector 10 according to any one the aforementioned embodiments can be used as the positive current collector and/or the negative current collector.

In some optional embodiments, the positive current collector is a metallic current collector such as an aluminum foil or an aluminum alloy current collector, or the above-mentioned composite current collector 10, and the negative current collector is the composite current collector 10. By replacing the conventional copper foil negative current collector having a greater density with the composite current collector 10, both the weight energy density and the low-temperature performance of the lithium ion secondary battery can be improved. In addition, by using the composite current collector 10 at the negative electrode plate, the lithium precipitation at the negative electrode can be prevented while improving the low-temperature performance of the lithium ion secondary battery, thereby improving the dynamic performance, rate performance and safety performance of the lithium ion secondary battery.

When both the positive current collector and the negative current collector are the composite current collector 10, the low-temperature performance of the lithium ion secondary battery can be further improved.

In the present disclosure, the thickness $D_1$ of the conductive layer 102 and the thickness $D_2$ of the support layer 101 can be measured by instruments and methods well known in the related art, for example, using a micrometer.

The thermal conductivity of the composite current collector 10 can be measured using instruments and methods well known in the related art, such as using a thermal conductivity meter. The measurement includes: cutting a composite current collector 10 into samples with 5 cm×5 cm, and measuring the thermal conductivity of the sample by using a TC3000 type thermal conductivity meter.

The volume resistivity $\rho$ of the conductive layer 102 satisfies $\rho=R_S \times d$, where $\rho$ is in units of $\Omega \cdot m$; $R_S$ is the sheet resistance of the conductive layer 102 in units of $\Omega$; and d represents the thickness of the conductive layer 102 in units of meter. The sheet resistance $R_S$ of the conductive layer 102 can be measured by the four-probe method with a RTS-9 type double electric four-probe tester. The test environment is: room temperature 23±2° C., normal pressure of 0.1 MPa, relative humidity ≤65%. During the test, the sample of the positive current collector 10 is surface cleaned, then placed horizontally on a test board, the probes are placed to be in good contact with the surface of the conductive layer 102 of the sample, a current range of the sample is calibrated in an automatic test mode, and then at an appropriate current range, the sheet resistance is measured. Eight to ten data points of the same sample are collected for sake of data measurement accuracy and error analysis, and the average is recorded as the sheet resistance of the conductive layer 102.

The Young's modulus E of the support layer 101 can be determined by a method known in the related art. As an example, the support layer 101 is cut into a sample of 15 mm×200 mm, and the thickness h (μm) of the sample is measured by a micrometer, and a tensile test is performed by using a tensile machine (such as Instron 3365 tensile machine, Instron, USA) at room temperature and normal pressure (25° C., 0.1 MPa). An initial position is set in such manner that the sample between clamps has a length of 50 mm, and the tensile speed is 5 mm/min. The load L (N) and a displacement y (mm) of the device at the time of tensile fracture are recorded, and a stress-strain curve is drawn according to stress $\varepsilon$ (GPa)=L/(15×h) and strain $\eta$=y/50 in which the slope of the initial linear zone in the curve is the Young's modulus E.

The bonding force F between the support layer 101 and the conductive layer 102 can be measured by a method known in the related art. For example, the composite current collector 10, in which the conductive layer 102 is disposed on one surface of the support layer 101, is used as a sample to be tested. The sample has a width d of 0.02 m. Under room temperature and normal pressure (25° C., 0.1 MPa), a 3M double-sided adhesive tape is evenly attached to a stainless steel plate, the sample is then evenly attached to the double-sided adhesive tape, and then the conductive layer 102 is continuously peeled off from the support layer 101 at 180° by using a tensile machine (such as Instron 3365 tensile machine, Instron, USA) at a speed of 50 mm/min. The maximum tensile force x(N) is read according to the data diagram of the tensile force and the displacement, and the bonding force F (N/m) between the conductive layer 102 and the support layer 101 is calculated according to F=x/d.

Positive Electrode Plate

The present disclosure provides a positive electrode plate for a lithium ion secondary battery. The positive electrode plate includes a positive current collector and a positive active material layer disposed on the positive current collector. For example, the positive current collector has two opposite surfaces in a thickness direction thereof, and the positive active material layers are stacked on the two surfaces of the positive current collector. It is also possible that the positive active material layer is stacked on any one of the two surfaces of the positive current collector.

When the negative current collector is the aforementioned metallic current collector, the positive current collector is the aforementioned composite current collector; or when the negative current collector is the aforementioned composite current collector, the positive current collector is the aforementioned composite current collector or a metallic current collector such as an aluminum foil or an aluminum alloy.

The positive current collector being the aforementioned composite current collector 10 not only can achieve the beneficial effects described above, but also may improve the safety performance of the lithium ion secondary battery.

The positive active material layer includes a positive active material, and the positive active material can be one or more active materials known in the related art that are capable of reversible intercalation/deintercalation of ions.

The positive active material is, for example, one or more of lithium cobalt oxide, lithium nickel oxide, lithium manganese oxide, lithium nickel manganese oxide, lithium nickel cobalt manganese oxide, lithium nickel cobalt aluminum oxide, lithium vanadium phosphate, lithium cobalt phosphate, lithium manganese phosphate, lithium iron phosphate, lithium manganese iron phosphate, lithium iron silicate, lithium vanadium silicate, lithium cobalt silicate, lithium manganese silicate, and lithium titanate. For example, the positive active material is one or more of $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b<1, 0<a+b<1), $LiMn_{1-m-n}$ $Ni_mCo_nO_2$ (0<m<1, 0<n<1, 0<m+n<1), $LiCoPO_4$, $LiMnPO_4$, $LiFePO_4$, $LiMn_{1-z}Fe_zPO_4$ (0<z<1), and $Li_3V_2(PO_4)_3$.

Optionally, the positive active material layer can further include a binder, which is not specifically limited herein. As examples, the binder is one or more of styrene butadiene rubber (SBR), water-based acrylic resin, carboxymethyl cellulose sodium (CMC-Na), polyvinylidene fluoride (PVDF), polytetrafluoroethylene (PTFE), ethylene-vinyl acetate copolymer (EVA), polyvinyl alcohol (PVA), and polyvinyl butyral (PVB).

Optionally, the positive active material layer can further include a conductive agent, which is not specifically limited herein. As examples, the conductive agent is one or more of graphite, superconductive carbon, acetylene black, carbon black, ketjen black, carbon dots, carbon nanotubes, graphene, and carbon nanofiber.

In some embodiments, the positive active material layer has a thickness $T_1$ in a range of 50 μm to 100 μm. When the thickness $T_1$ of the positive active material layer falls within the above range, the positive active material layer has better effect on improving the performances at low temperature of the lithium ion secondary battery, and makes sure that the positive electrode has good dynamic performance, thereby improving the electrochemical performance of the lithium ion secondary battery. More preferably, the thickness $T_1$ of the positive active material layer is in a range of 60 μm to 90 μm, which can further improve the performances at low temperature of the lithium ion secondary battery, thereby obtaining the positive electrode plate and the lithium ion secondary battery having good overall performance.

The "thickness $T_1$ of the positive active material layer" is a thickness of the positive active material layer on one side of the positive current collector.

The positive electrode plate can be prepared according to a conventional method in the related art, such as a coating method. As an example, the positive active material, as well as optionally a conductive agent and a binder are dispersed in a solvent such as N-methylpyrrolidone (NMP), so as to form a uniform positive slurry. The positive slurry is coated on a positive current collector, followed by drying, thereby obtaining a positive electrode plate.

Negative Electrode Plate

The present disclosure provides a negative electrode plate for a lithium ion secondary battery. The negative electrode plate includes a negative current collector and a negative active material layer disposed on the negative current collector. For example, the negative current collector has two opposite surfaces in a thickness direction thereof, and the negative active material layer is disposed on the two surfaces of the negative current collector. It is also possible that the negative active material layer is disposed on any one of the two surfaces of the negative current collector.

When the positive current collector is the metallic current collector, the negative current collector is the aforementioned composite current collector; or when the positive current collector is the aforementioned composite current collector, the negative current collector is the aforementioned composite current collector or metallic current collector, such as copper foil or copper alloy.

The negative current collector being the composite current collector as described above also ha has the same beneficial effects, which are not repeated herein.

The negative active material layer includes a negative active material, and the negative active material can be one or more active materials known in the related art that are capable of reversible intercalation/deintercalation of ions, which are not specifically limited herein. The negative active material is, for example, one or more of lithium metal, natural graphite, artificial graphite, mesophase carbon microbead (abbreviated as MCMB), hard carbon, soft carbon, silicon, silicon-carbon composite, SiO, Li—Sn alloy, Li—Sn—O alloy, Sn, SnO, $SnO_2$, spinel-structured lithium titanate, and a Li—Al alloy.

Optionally, the negative active material layer can further include a conductive agent, which is not specifically limited herein. As examples, the conductive agent may include one or more of graphite, superconductive carbon, acetylene black, carbon black, ketjen black, carbon dots, carbon nanotubes, graphene, and carbon nanofiber.

Optionally, the negative active material layer 201 can further include a binder, which is not specifically limited herein. As examples, the binder may include one or more of styrene butadiene rubber (SBR), water-based acrylic resin, carboxymethyl cellulose sodium (CMC-Na), polyvinylidene fluoride (PVDF), polytetrafluoroethylene (PTFE), ethylene-vinyl acetate copolymer (EVA), polyvinyl alcohol (PVA), and polyvinyl butyral (PVB).

In an embodiment, preferably, the negative active material layer has a thickness $T_2$ in a range of 30 μm to 70 μm. When the thickness $T_2$ of the negative active material layer falls within the above range, the negative active material layer has better effect on improving the performances at low temperature of the lithium ion secondary battery while making sure that the negative electrode has good dynamic performance, thereby improving the electrochemical performance of the lithium ion secondary battery. More preferably, the thickness $T_2$ of the negative active material layer is in a range of 40 μm to 60 μm, which can further improve the performances at low temperature of the lithium ion secondary battery, thereby obtaining the negative electrode plate and the lithium ion secondary battery having good overall performance.

The "thickness $T_2$ of the negative active material layer" is a thickness of the negative active material layer on one side of the negative current collector.

The negative electrode plate can be prepared according to a conventional method known in the related art, such as a coating method. As an example, the negative active material, as well as optionally a conductive agent and a binder are dispersed in a solvent such as deionized water, so as to form a uniform negative slurry. The negative slurry is coated on a negative current collector followed by drying, thereby obtaining a negative electrode plate.

Electrolytic Solution

The present disclosure further provides an electrolytic solution of a lithium ion secondary battery. The electrolytic solution includes an organic solvent and an electrolytic salt dispersed in the organic solvent.

For example, the organic solvent of the lithium ion secondary battery can include one or more of ethylene carbonate (EC), propylene carbonate (PC), pentylene carbonate, 1,2-butanediol carbonate (1,2-BC), 2,3-butanediol carbonate (2,3-BC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), ethyl methanoate (EM), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl ether (ESE).

In some preferred embodiments, the organic solvent is a mixed solvent including a cyclic carbonate and a chain carbonate. Such an organic solvent is advantageous for preparing an electrolytic solution having excellent comprehensive properties such as conductivity and viscosity. Preferably, the electrolytic solution has a conductivity at 25° C. of 8 mS/cm to 11 mS/cm. The electrolytic solution can have good ion-conducting dynamic performance and thermal stability both. Therefore, the battery can have relatively high cycle performance at normal temperature and at low temperature, as well as at high temperature.

For example, the electrolytic salt of the lithium ion secondary battery can include one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonylmide), LiTFSI (lithium bis(fluorosulfonyl)imide), LiTFS (lithium trifluoromethanesulfonate), LiDFOB (lithium difluoro(oxalate)borate), LiBOB (lithium bis(oxalate)borate), $LiPO_2F_2$ (lithium difluorophosphate), LiDFOP (lithium difluorodioxalate phosphate), and LiTFOP (lithium tetrafluorooxalate phosphate).

Optionally, the electrolytic solution can further include an additive. For example, the additive may include a negative electrode film-forming additive, and may also include a positive film-forming additive, and may also include an additive capable of improving certain properties of the battery, such as an additive for improving overcharge performance of the battery, an additive for improving high temperature performance, an additive for improving low temperature performance of the battery, and the like.

Separator

The separator is not specifically limited in the present disclosure, and can be any well-known porous separator having good chemical stability and mechanical stability, such as one or more of glass fiber, non-woven fabric, polyethylene, polypropylene, or polyvinylidene fluoride. The separator can be a single layer film or a multilayer composite film. When the separator is the multilayer composite film, each layer can be made of the same or different material. The separator can also be a composite separator, such as a composite separator having an inorganic coating on a surface of an organic separator.

In some embodiments, preferably, the separator has a porosity in a range of 30% to 50%, and preferably 35%-45%, which can further improve the dynamic performance of the lithium ion secondary battery, and is conducive to improving the low temperature performance of the lithium ion secondary battery. In the meantime, the battery adopting such a separator can have higher energy density.

In some embodiments, the lithium ion secondary battery may include an outer package for encapsulating the positive electrode plate, the negative electrode plate, and the electrolytic solution. As an example, the positive electrode plate, the negative electrode plate, and the separator may be stacked or wound to form a battery core having a stacked structure or a battery core having a wound structure, and the battery core is encapsulated in the outer package. The electrolytic solution is impregnated in the battery core. There may be one or more battery cores provided in the battery, which can be adjusted according to requirements.

In some embodiments, the outer package of the battery may be a soft package, such as a pouch. The material of the soft package may be plastic, such as one or more of polypropylene PP, polybutylene terephthalate PBT, polybutylene succinate PBS, and the like. The outer package of the battery may also be a hard package, such as an aluminum casing.

Figure 6:
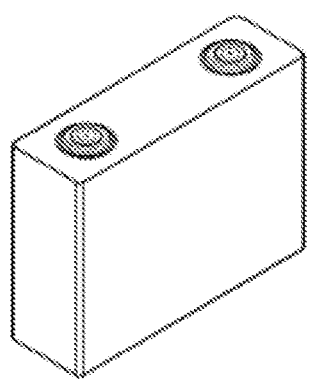
FIG. 6 is a schematic diagram of a lithium ion secondary battery according to an embodiment of the present disclosure.

The shape of the battery is not particularly limited in the present disclosure, and may be cylindrical, square, or any other shape. FIG. 6 illustrates a lithium ion secondary battery 5 having a rectangular structure as an example.

In some embodiments, the lithium ion secondary battery can be assembled into a battery module. The battery module may include a plurality of lithium ion secondary batteries, and the specific number can be adjusted according to the application and capacity of the battery module.

Figure 7:
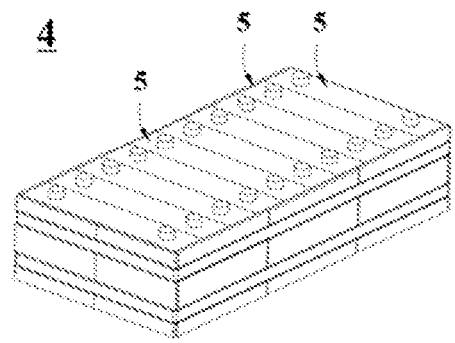
FIG. 7 is a schematic diagram of a battery module according to an embodiment of the present disclosure.

FIG. 7 illustrates a battery module 4 as an example. Referring to FIG. 7, in the battery module 4, a plurality of lithium ion secondary batteries 5 are sequentially arranged along a length direction of the battery module 4. It is also possible that a plurality of lithium ion secondary batteries 5 are arranged in any other manner. Further, a plurality of lithium ion secondary batteries 5 can be fixed by a fastener.

The battery module 4 may further include a casing having a receiving space, in which a plurality of lithium ion secondary batteries 5 are received.

In some embodiments, the above battery module can also be assembled into a battery pack, and the number of battery modules included in the battery pack can be adjusted according to the application and capacity of the battery pack.

Figure 8:
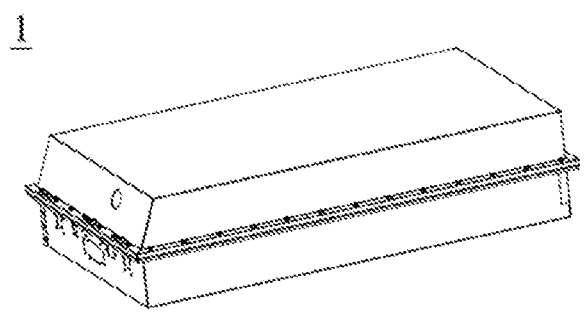
FIG. 8 is a schematic diagram of a battery pack according to an embodiment of the present disclosure.
Figure 9:
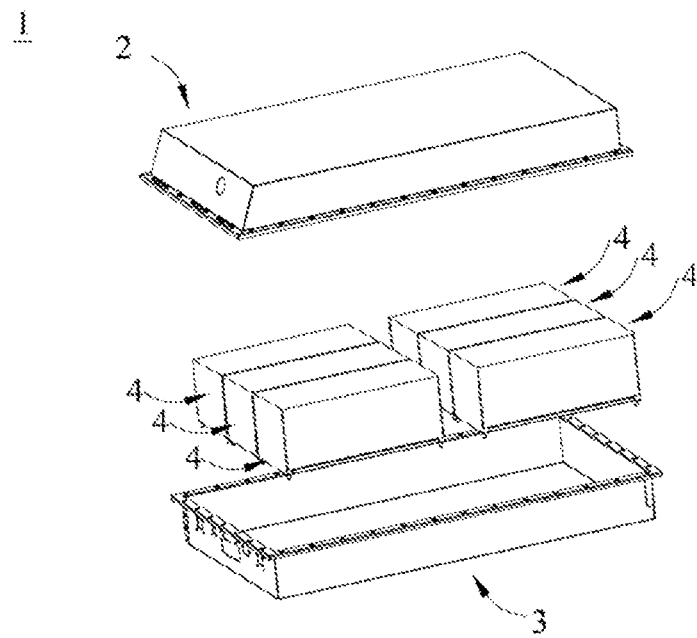
FIG. 9 is an exploded view of FIG. 8.

FIG. 8 and FIG. 9 illustrate a battery pack 1 as an example. With reference to FIG. 8 and FIG. 9, the battery pack 1 may include a battery box and a plurality of battery modules 4 provided in the battery box. The battery box includes an upper box 2 and a lower box 3 and the upper box 2 is arranged to cover the lower box 3, so as to form a closed space for receiving the battery modules 4. A plurality of battery modules 4 can be arranged in the battery box in any manner.

Apparatus

The present disclosure provides an apparatus including one or more lithium ion secondary batteries according to the present disclosure. The lithium ion secondary battery may be used as a power source of the apparatus or as an energy storage unit of the apparatus. The apparatus may be, but is not limited to, a mobile apparatus (such as a mobile phone, a notebook computer, and the like), an electric vehicle (such as a pure electric vehicle, a hybrid electric vehicle, a plug-in hybrid electric vehicle, an electric bicycle, an electric scooter, and an electric golf vehicles, electric trucks, and the like), electric trains, ships and satellites, energy storage systems, or the like. The apparatus can adopt different electrochemical devices, such as a battery, a battery module, or a battery pack, according to application requirements.

Figure 10:
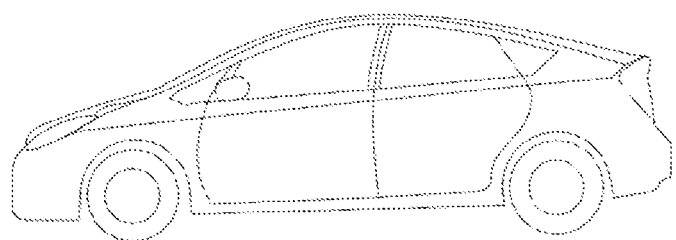
FIG. 10 is a schematic diagram of an apparatus according to an embodiment of the present disclosure

FIG. 10 illustrates an apparatus as an example. The apparatus is a pure electric vehicle, a hybrid electric vehicle, or a plug-in hybrid electric vehicle. In order to meet the requirements of the apparatus on high power and high energy density of electrochemical device, a battery pack or a battery module can be used.

As another example, the apparatus may be a mobile phone, a tablet computer, a notebook computer, and the like. The apparatus is generally required to be thin and light, and a secondary battery can be used as a power source.

Examples

The following examples are intended to describe the present disclosure more specifically, merely for the purpose of illustration. Various modifications and variations within the scope of the present disclosure are apparent to those skilled in the related art. The parts, percentages, and ratios mentioned in the following examples are accounted by weight unless otherwise stated, all reagents used in the examples are commercially available or can be directly synthesized according to conventional method without further processing, and the instruments used in the examples are also commercially available.

Preparation Methods

Preparation of Conventional Positive Electrode Plate

A positive active material (lithium iron phosphate, referred to as LFP; or $LiNi_{1/3}Co_{1/3}Mn_{1/3}O_2$, referred to as NCM333), PVDF as binder, and acetylene black as conductive agent were mixed in a weight ratio of 93:2:5, and then N-methylpyrrolidone (NMP) was added; the mixture was thoroughly and uniformly stirred in a vacuum mixer to obtain a positive slurry; the positive slurry was then coated on an aluminum foil, which was used as a positive current collector, followed by drying, cold pressing and cutting, thereby obtaining a conventional positive electrode plate. The conventional positive electrode plate had a compaction density of 2.4 $g/cm^3$.

Preparation of Positive Electrode Plate

The positive electrode plate was prepared in a similar process as that of the conventional positive electrode plate with the exception that, the positive current collector was a composite current collector. The composite current collector was prepared by vacuum evaporation including selecting a polymer-based support layer having a predetermined thickness and performing surface cleaning on the support layer; placing the surface-cleaned support layer in a vacuum plating chamber; evaporating a high-purity aluminium wire in a metal evaporating chamber at a high temperature of 1300° C. to 2000° C.; and depositing the evaporated metal on both surfaces of the support layer after the evaporated metal passing through a cooling system in the vacuum plating chamber, so as to form conductive layers.

Preparation of Conventional Negative Electrode Plate

Graphite as a negative active material, acetylene black as a conductive agent, CMC-Na as a thickener, and SBR as binder were mixed in a weight ratio of 97:1:1:1, and then deionized water was added; the mixture was thoroughly and uniformly stirred in a vacuum mixer to obtain negative slurry; the negative slurry was then uniformly coated on a copper foil, which was used as a negative current collector, followed by drying, cold pressing and cutting, thereby obtaining a conventional negative electrode plate. The conventional negative electrode plate had a compaction density of 1.7 $g/cm^3$.

Preparation of Negative Electrode Plate

The negative electrode plate was prepared in a similar process as that of the conventional negative electrode plate with the exception that, the negative current collector is a composite current collector. The composite current collector was prepared by vacuum evaporation including: selecting a polymer-based support layer having a predetermined thickness and performing surface cleaning on the support layer; placing the surface-cleaned support layer in a vacuum plating chamber; evaporating a high-purity copper wire in a metal evaporating chamber at a high temperature of 1300° C. to 2000° C.; and depositing the evaporated metal on both surfaces of the support layer after the evaporated metal passing through a cooling system in the vacuum plating chamber, so as to form conductive layers.

Preparation of Electrolytic Solution

The organic solvent was a mixed solvent of ethylene carbonate (EC), ethyl methyl carbonate (EMC), diethyl carbonate (DEC), dimethyl carbonate (DMC), and methyl propionate (MP). The electrolytic salt was $LiPF_6$. $LiPF_6$ is present in the electrolytic solution in a mass percentage of 12.5 wt %.

Preparation of Lithium Ion Secondary Battery

The positive electrode plate, the negative electrode plate and the separator were winded to obtain a battery core, the battery core was placed into a package case, then the electrolytic solution was injected and the package case was sealed, and a lithium ion secondary battery was obtained after being subjected to standing, compaction, formation, venting, and the like.

Tests (1) Tests of Low Temperature Performance of Lithium Ion Secondary Battery

At 25° C., the lithium ion secondary battery was first discharged to 1C to the lower limit of a charge and discharge cutoff voltage, then charged at 1C constant current to the upper limit of the charge and discharge cutoff voltage, then charged at a constant voltage until the current was 0.05C, and a charging capacity CC was recorded. After that, the ambient temperature of the battery was adjusted to −10° C., and the battery was discharged with 1 C constant current to the lower limit of the charge and discharge cutoff voltage, and a discharge capacity CD was recorded. The ratio of the discharge capacity CD to the charge capacity CC is the discharge capacity retention of the lithium ion secondary battery at −10° C. Discharge capacity retention ratio (%) of lithium ion secondary battery at −10° C.=CD/CC×100%.

(2) Tests of High Temperature Performance of Lithium Ion Secondary Battery

At 25° C., the lithium ion secondary battery was first discharged to 1C to the lower limit of the charge and discharge cutoff voltage, then the ambient temperature of the battery was increased to 60° C., and the battery was charged at 1C constant current to the upper limit of the charge and discharge cutoff voltage and then charged at constant voltage until the current was 0.05C; and after that, the battery was discharged with 1 C constant current to the lower limit of the charge and discharge cutoff voltage. The above process is one charge and discharge cycle. 500 times of the above charge and discharge cycles were performed on the battery, and a discharge capacity for the $500^{th}$ cycle of the lithium ion secondary battery at 60° C. was recorded.

Capacity retention ratio (%) of lithium ion secondary battery after 500 cycles at 60° C.=discharge capacity for $500^{th}$ cycle/discharge capacity for $1^{st}$ cycle.

In the above tests of (1) and (2), the charge and discharge cutoff voltage of the lithium ion secondary battery in which LFP was as the positive active material was in a range of 2.0V to 3.6V; and the charge and discharge cutoff voltage of the lithium ion secondary battery in which NCM333 is used as the positive active material was in a range of 2.8V to 4.2V.

Test Results

1. Effects of composite current collector on improving weight energy density of lithium ion secondary battery 1) Effects of the Composite Current Collector as a Positive Current Collector on Improving Weight Energy Density of Lithium Ion Secondary Battery

TABLE 1-1

| Positive current collector No. | Support layer Material | $D_2$ (μm) | Conductive layer Material | $D_1$ (μm) | Thickness of positive current collector (μm) | Weight percentage of positive current collector (%) |
|---|---|---|---|---|---|---|
| Positive current collector 1 | PET | 10 | Al | 0.5 | 11.0 | 48.3 |
| Positive current collector 2 | PI | 6 | Al | 0.3 | 6.6 | 30.0 |
| Positive current collector 3 | PI | 5 | Al | 1.5 | 8.0 | 45.8 |
| Positive current collector 4 | PET | 4 | Al | 0.9 | 5.8 | 31.0 |
| Positive current collector 5 | PI | 3 | Al | 0.2 | 3.4 | 15.8 |
| Positive current collector 6 | PI | 1 | Al | 0.4 | 1.8 | 10.9 |
| Conventional positive current collector | / | / | Al | 12.0 | 12.0 | 100 |

In Table 1-1, the weight percentage of the positive current collector was percentage of a weight per unit area of the positive current collector to a weight per unit area of the conventional positive current collector.

Compared with the conventional aluminum foil negative current collector, the weights of all positive current collectors adopting the composite current collectors were reduced to different extents, thereby increasing the weight energy density of the battery.

2) Effects the Composite Current Collector as a Negative Current Collector on Improving Weight Energy Density of Lithium Ion Secondary Battery In Table 1-2, the weight percentage of the negative current collector was a percentage of a weight per unit area of the negative current collector to a weight per unit area of the conventional negative current collector. Compared with the conventional copper foil negative current collector, the weights of all negative current collectors adopting the composite current collectors were reduced to different extents, thereby increasing the weight energy density of the battery.

TABLE 1-2

| Negative current collector No. | Support layer Material | $D_2$ (μm) | Conductive layer Material | $D_1$ (μm) | Thickness of negative current collector (μm) | Weight percentage of negative current collector (%) |
|---|---|---|---|---|---|---|
| Negative current collector 1 | PET | 5 | Cu | 0.03 | 5.06 | 7 |
| Negative current collector 2 | PET | 5 | Cu | 0.3 | 5.6 | 16 |
| Negative current collector 3 | PET | 5 | Cu | 0.5 | 6 | 21.6 |
| Negative current collector 4 | PET | 5 | Cu | 0.6 | 6.2 | 24.1 |
| Negative current collector 5 | PI | 2 | Cu | 0.8 | 3.6 | 23.8 |
| Negative current collector 6 | PET | 8 | Cu | 1 | 10 | 39.6 |
| Negative current collector 7 | PET | 6 | Cu | 1.5 | 9 | 48.5 |
| Negative current collector 8 | PET | 4 | Cu | 1.2 | 6.4 | 37.3 |
| Negative current collector 9 | PET | 10 | Cu | 0.2 | 10.4 | 23.3 |
| Negative current collector 10 | PI | 8 | Cu | 2 | 12 | 65.3 |
| Negative current collector 11 | PET | 5 | Cu | 3 | 11 | 57.2 |
| Conventional negative current collector | / | / | Cu | 8 | 8 | 100 |

2. Thermal Conductivity of the Composite Current Collector and its Effects on Low Temperature Performance of Lithium Ion Secondary Battery

TABLE 2-1

| Current collector No. | Support layer Material | $D_2$ (μm) | conductive layer Material | $D_1$ (μm) | F | thermal conductivity (W/(m·K)) |
|---|---|---|---|---|---|---|
| Positive current collector 2-1 | PET | 8 | Al | 0.4 | >100 N/m | 0.2 |
| Positive current collector 2-2 | PET | 6 | Al | 0.6 | >100 N/m | 1 |
| Positive current collector 2-3 | PET | 6 | Al | 1.0 | >100 N/m | 1.5 |
| Conventional positive current collector | / | / | Al | 12.0 | / | 218 |
| Negative current collector 2-1 | PET | 16 | Cu | 0.2 | >100 N/m | 0.01 |
| Negative current collector 2-2 | PET | 8 | Cu | 0.4 | >100 N/m | 0.1 |
| Negative current collector 2-3 | PET | 4 | Cu | 0.6 | >100 N/m | 0.5 |
| Negative current collector 2-4 | PET | 4 | Cu | 1.0 | >100 N/m | 1 |
| Negative current collector 2-5 | PET | 4 | Cu | 2.0 | >100 N/m | 2 |
| Negative current collector 2-6 | PET | 2 | Cu | 3.0 | >100 N/m | 10 |
| Conventional negative current collector | / | / | Cu | 8.0 | / | 381 |

TABLE 2-2

| Battery No. | Positive current collector | Positive active material | Negative current collector | Negative active material | Discharge capacity retention ratio at −10° C. (%) |
|---|---|---|---|---|---|
| Comparative Battery 1 | Conventional positive current collector | NCM333 | Conventional negative current collector | Graphite | 82 |
| Comparative Battery 2 | Conventional positive current collector | LFP | Conventional negative current collector | Graphite | 75 |
| Battery 1 | Conventional positive current collector | LFP | Negative current collector 2-1 | Graphite | 92 |
| Battery 2 | Conventional positive current collector | LFP | Negative current collector 2-2 | Graphite | 89 |
| Battery 3 | Conventional positive current collector | LFP | Negative current collector 2-3 | Graphite | 87 |
| Battery 4 | Conventional positive current collector | LFP | Negative current collector 2-4 | Graphite | 84 |
| Battery 5 | Conventional positive current collector | LFP | Negative current collector 2-5 | Graphite | 81 |
| Battery 6 | Conventional positive current collector | LFP | Negative current collector 2-6 | Graphite | 78 |
| Battery 7 | Positive current collector 2-1 | NCM333 | Conventional negative current collector | Graphite | 93 |

TABLE 2-2-continued

| Battery No. | Positive current collector | Positive active material | Negative current collector | Negative active material | Discharge capacity retention ratio at −10° C. (%) |
|---|---|---|---|---|---|
| Battery 8 | Positive current collector 2-2 | NCM333 | Negative current collector 2-4 | Graphite | 88 |
| Battery 9 | Positive current collector 2-3 | NCM333 | Negative current collector 2-4 | Graphite | 86 |

In the batteries listed in Table 2-2, each negative active material layer had a thickness of 52 μm, each positive active material layer had a thickness of 74 μm. It was shown from the data in Table 2-2 that the low temperature performance of the lithium ion secondary battery was improved when the thermal conductivity of the composite current collector was within the range of 0.01 W/(m·K) to 10 W/(m·K).

3. Effects of Thickness of Active Material Layer on Low Temperature Performance of Lithium Pion Secondary Battery

TABLE 3

| Battery No. | Positive current collector | Thickness of positive active material layer (μm) | Negative current collector | Thickness of negative active material layer (μm) | Discharge capacity retention ratio at −10° C. (%) |
|---|---|---|---|---|---|
| Comparative battery 4-1 | Conventional positive current collector | 110 | Negative current collector 2-4 | 52 | 73 |
| Battery4 | Conventional positive current collector | 74 | Negative current collector 2-4 | 52 | 84 |
| Battery4-1 | Conventional positive current collector | 50 | Negative current collector 2-4 | 52 | 81 |
| Battery4-2 | Conventional positive current collector | 60 | Negative current collector 2-4 | 52 | 83 |
| Battery4-3 | Conventional positive current collector | 90 | Negative current collector 2-4 | 52 | 82 |
| Battery4-4 | Conventional positive current collector | 100 | Negative current collector 2-4 | 52 | 79 |
| Battery4-5 | Conventional positive current collector | 74 | Negative current collector 2-4 | 30 | 77 |
| Battery4-6 | Conventional positive current collector | 74 | Negative current collector 2-4 | 40 | 82 |
| Battery4-7 | Conventional positive current collector | 74 | Negative current collector 2-4 | 60 | 83 |
| Battery4-8 | Conventional positive current collector | 74 | Negative current collector 2-4 | 70 | 80 |
| Comparative battery 4-2 | Conventional positive current collector | 74 | Negative current collector 2-4 | 85 | 75 |

In Table 3, the positive active material of each positive active material layer was LFP, and the negative active material of each negative active material layer was graphite.

It was shown from the data in Table 3 that the lithium ion secondary battery according to the present disclosure exhibited much better low temperature performance when the thickness $T_1$ of the positive active material layer was within the range of 50 μm to 100 μm; and the low temperature performance of the lithium ion secondary battery was further improved when the thickness $T_1$ of the positive active material layer was within a range of 60 μm to 90 μm. It was also shown from the data in Table 3 that the lithium ion secondary battery according to the present disclosure exhibited much better low temperature performance when the thickness $T_2$ of the negative active material layer was within the range of 30 μm to 70 μm; and the low temperature performance of the lithium ion secondary battery was further improved when the thickness $T_2$ of the negative active material layer was within a range of 40 μm to 60 μm.

4. Effects of Protective Layer on Electrochemical Performance of Lithium Ion Secondary Battery

TABLE 4-1

| Positive current collector No. | Second protective layer | | First protective layer | |
|---|---|---|---|---|
| | Material | $D_a$ (nm) | Material | $D_b$ (nm) |
| Positive current collector 2-3-1 | / | / | Nickel | 1 |
| Positive current collector 2-3-2 | / | / | Nickel oxide | 50 |
| Positive current collector 2-3-3 | Nickel oxide | 5 | / | / |
| Positive current collector 2-3-4 | Nickel oxide | 10 | / | / |
| Positive current collector 2-3-5 | Nickel oxide | 50 | Nickel oxide | 50 |
| Positive current collector 2-3-6 | Nickel oxide | 100 | Nickel oxide | 50 |

In Table 4-1, the protective layer was disposed on the positive current collector 2-3.

TABLE 4-2

| Battery No. | Positive current collector | Positive active material | Negative current collector | Negative active material | Capacity retention ratio after 500 cycles at 60° C. (%) |
|---|---|---|---|---|---|
| Battery 9 | Positive current collector 2-3 | NCM333 | Negative current collector 2-4 | Graphite | 80 |
| Battery 9-1 | Positive current collector 2-3-1 | NCM333 | Negative current collector 2-4 | Graphite | 81 |
| Battery 9-2 | Positive current collector 2-3-2 | NCM333 | Negative current collector 2-4 | Graphite | 82 |
| Battery 9-3 | Positive current collector 2-3-3 | NCM333 | Negative current collector 2-4 | Graphite | 81 |
| Battery 9-4 | Positive current collector 2-3-4 | NCM333 | Negative current collector 2-4 | Graphite | 82 |
| Battery 9-5 | Positive current collector 2-3-5 | NCM333 | Negative current collector 2-4 | Graphite | 83 |
| Battery 9-6 | Positive current collector 2-3-6 | NCM333 | Negative current collector 2-4 | Graphite | 84 |

In the batteries listed in Table 4-2, each negative active material layer had a thickness of 52 μm, and each positive active material layer had thickness of 74 μm.

It was shown from the data in Table 4-2 that, when positive current collector was the composite current collector, the capacity retention ratio after 500 1C/1C cycles at 60° C. was further increased by disposing protective layer, thereby enhancing the reliability of the battery.

TABLE 4-3

| Negative current collector No. | Second protective layer | | First protective layer | |
|---|---|---|---|---|
| | Material | $D_a$ (nm) | Material | $D_b$ (nm) |
| Negative current collector 2-5-1 | / | / | Nickel oxide | 1 |
| Negative current collector 2-5-2 | / | / | Nickel-based alloy | 50 |
| Negative current collector 2-5-3 | Nickel | 5 | / | / |
| Negative current collector 2-5-4 | Nickel | 10 | / | / |
| Negative current collector 2-5-5 | Nickel | 50 | Nickel | 50 |
| Negative current collector 2-5-6 | Nickel | 100 | Nickel | 50 |
| Negative current collector 2-5-7 | double protective layers | 60 | Nickel | 50 |

In Table 4-3, the protective layer was disposed on the positive current collector 2-5.

In Table 4-3, the nickel-based alloy contained 90 wt % of nickel and 10 wt % of chromium.

In Table 4-3, the double protective layers included a nickel protective layer having a thickness of 30 nm and disposed on the surface of the conductive layer facing away from the support layer; and a nickel oxide protective layer having a thickness of 30 nm and disposed on the surface of the nickel protective layer facing away from the support layer.

TABLE 4-4

| Battery No. | Positive current collector | Positive active material | Negative current collector | Negative active material | Capacity retention ratio after 500 cycles at 60° C. (%) |
|---|---|---|---|---|---|
| Battery 5 | Conventional positive current collector | LFP | Negative current collector 2-5 | Graphite | 90 |
| Battery 5-1 | Conventional positive current collector | LFP | Negative current collector 2-5-1 | Graphite | 91 |
| Battery 5-2 | Conventional positive current collector | LFP | Negative current collector 2-5-2 | Graphite | 92 |
| Battery 5-3 | Conventional positive current collector | LFP | Negative current collector 2-5-3 | Graphite | 91 |
| Battery 5-4 | Conventional positive current collector | LFP | Negative current collector 2-5-4 | Graphite | 92 |
| Battery 5-5 | Conventional positive current collector | LFP | Negative current collector 2-5-5 | Graphite | 93 |
| Battery 5-6 | Conventional positive current collector | LFP | Negative current collector 2-5-6 | Graphite | 94 |
| Battery 5-7 | Conventional positive current collector | LFP | Negative current collector 2-5-7 | Graphite | 93 |

In the batteries listed in Table 4-4, each negative active material layer had a thickness of 52 μm, and each positive active material layer had a thickness of 74 μm.

It was shown from the data in Table 4-4 that, when negative current collector was the composite current collector, the capacity retention ratio after 500 1C/1C cycles at 60° C. was further increased by disposing a protective layer, thereby enhancing the reliability of the battery.

The above describes merely specific embodiments of the present disclosure, but is not intended to limit the protection scope of the present disclosure. Various equivalent variations or replacements obtained by those skilled in the related art within the scope of present disclosure shall fall within the protection scope of the present application. The protection scope of the present disclosure shall be defined by the claims.

What is claimed is:

1. A lithium ion secondary battery, comprising:
   a battery core; and
   an electrolytic solution,
   wherein the battery core comprises:
   a positive electrode plate comprising a positive current collector and a positive active material layer disposed on a surface of the positive current collector;
   a separator; and
   a negative electrode plate comprising a negative current collector and a negative active material layer disposed on a surface of the negative current collector,
   wherein the positive current collector and/or the negative current collector are a composite current collector, the composite current collector comprises a polymer-based support layer and a conductive layer disposed on at least one surface of the support layer, and the composite current collector has a thermal conductivity in a range of 0.01 W/(m·K) to 10 W/(m·K), preferably in a range of 0.1 W/(m·K) to 2 W/(m·K),
   wherein the composite current collector further comprises a first protective layer, and the first protective layer is disposed between the conductive layer and the support layer; and/or
   the composite current collector further comprises a second protective layer, and the second protective layer is disposed on the surface of the conductive layer facing away from the support layer; and
   wherein when the composite current collector is a negative current collector, the composite current collector comprises the second protective layer, and the second protective layer comprises:
   a metal protective layer disposed on the surface of the conductive layer facing away from the support layer; and
   a metal oxide protective layer disposed on the surface of the metal protective layer facing away from the support layer,
   wherein the conductive layer has a thickness $D_1$ satisfying 300 nm≤$D_1$≤2 μm, and/or the support layer has a thickness $D_2$ satisfying 1 μm≤$D_2$≤15 μm,
   wherein the support layer comprises one or more of polyamide, polyimide, polyethylene terephthalate, polybutylene terephthalate, polyethylene naphthalate, polycarbonate, polyethylene, polypropylene, poly(propylene ethylene), acrylonitrile-butadiene-styrene copolymer, polyvinyl alcohol, polystyrene, polyvinyl chloride, polyvinylidene fluoride, polytetrafluoroethylene, poly(sodium styrenesulfonate), polyacetylene, silicone rubber, polyoxymethylene, polyphenylene oxide, polyphenylene sulfide, polyethylene glycol, polysulfurnitride, polyphenylene, polypyrrole, polyaniline, polythiophene, polypyridine, cellulose, starch, protein, epoxy resin, phenolic resin, derivatives thereof, cross-links thereof, and copolymers thereof,
   wherein the conductive layer comprises one or more of a metallic material, a carbon-based conductive material, and a conductive polymer material;

the first protective layer comprises one or more of a metallic material, a metal oxide material, and conductive carbon, and the second protective layer comprises one or more of a metallic material, a metal oxide material, and conductive carbon, the first protective layer has a thickness $D_b$ that satisfies 1 nm≤$D_b$≤200 nm and $D_b$≤0.1$D_1$, and the second protective layer has a thickness $D_a$ satisfying 1 nm≤$D_a$≤200 nm and $D_a$≤0.1$D_1$.

2. The lithium ion secondary battery according to claim 1, wherein the conductive layer has a thickness $D_1$ satisfying 500 nm≤$D_1$≤1.5 μm, and further more preferably 800 nm≤$D_1$≤1.2 μm; and/or the support layer has a thickness $D_2$ satisfying 1 μm≤$D_2$≤10 μm, and more preferably 2 μm≤$D_2$≤8 μm.

3. The lithium ion secondary battery according to claim 1, satisfying at least one of the following conditions:

the positive active material layer has a thickness $T_1$ satisfying 50 μm≤$T_1$≤100 μm, and preferably 60 μm≤$T_1$≤90 μm;

the negative active material layer has a thickness $T_2$ satisfying 30 μm≤$T_2$≤70 μm, and preferably 40 μm≤$T_2$≤60 μm;

the electrolytic solution has a conductivity at 25° C. in a range of 8 mS/cm to 11 mS/cm; and/or the separator has a porosity in a range of 30% to 50%.

4. The lithium ion secondary battery according to claim 1, wherein the support layer has a Young's modulus E satisfying E≥2 GPa, and preferably 2 GPa≤E≤20 GPa; and/or a bonding force F between the support layer and the conductive layer satisfies F≥100 N/m, and preferably F≥400 N/m.

5. The lithium ion secondary battery according to claim 1, wherein the support layer further comprises an additive, and the additive comprises one or more of a metallic material, and an inorganic non-metallic material.

6. The lithium ion secondary battery according to claim 1, wherein the conductive layer has a volume resistivity smaller than or equal to $8.0 \times 10^{-8}$ Ω·m.

7. The lithium ion secondary battery according to claim 1, wherein the first protective layer comprises one or more of nickel, chromium, nickel-based alloy, copper-based alloy, aluminum oxide, cobalt oxide, chromium oxide, nickel oxide, graphite, superconductive carbon, acetylene black, carbon black, ketjen black, carbon dots, carbon nanotubes, graphene, and carbon nanofibers; and/or the second protective layer comprises one or more of nickel, chromium, nickel-based alloy, copper-based alloy, aluminum oxide, cobalt oxide, chromium oxide, nickel oxide, graphite, superconductive carbon, acetylene black, carbon black, ketjen black, carbon dots, carbon nanotubes, graphene, and carbon nanofibers.

8. The lithium ion secondary battery according to claim 1, wherein the positive current collector is a metal current collector or the composite current collector, and the negative current collector is the composite current collector.

9. A battery core for a lithium ion secondary battery, comprising:

a positive electrode plate comprising a positive current collector and a positive active material layer disposed on a surface of the positive current collector;

a separator; and a negative electrode plate comprising a negative current collector and a negative active material layer disposed on a surface of the negative current collector, wherein the positive current collector and/or the negative current collector are a composite current collector, the composite current collector comprises a polymer-based support layer and a conductive layer disposed on at least one surface of the support layer, and the composite current collector has a thermal conductivity in a range of 0.01 W/(m·K) to 10 W/(m·K), preferably in a range of 0.1 W/(m·K) to 2 W/(m·K), wherein the composite current collector further comprises a first protective layer, and the first protective layer is disposed between the conductive layer and the support layer; and/or the composite current collector further comprises a second protective layer, and the second protective layer is disposed on the surface of the conductive layer facing away from the support layer; and wherein when the composite current collector is a negative current collector, the composite current collector comprises the second protective layer, and the second protective layer comprises:

a metal protective layer disposed on the surface of the conductive layer facing away from the support layer; and a metal oxide protective layer disposed on the surface of the metal protective layer facing away from the support layer, wherein the conductive layer has a thickness $D_1$ satisfying 300 nm≤$D_1$≤2 μm, and/or the support layer has a thickness $D_2$ satisfying 1 μm≤$D_2$≤15 μm, wherein the support layer comprises one or more of polyamide, polyimide, polyethylene terephthalate, polybutylene terephthalate, polyethylene naphthalate, polycarbonate, polyethylene, polypropylene, poly(propylene ethylene), acrylonitrile-butadiene-styrene copolymer, polyvinyl alcohol, polystyrene, polyvinyl chloride, polyvinylidene fluoride, polytetrafluoroethylene, poly(sodium styrenesulfonate), polyacetylene, silicone rubber, polyoxymethylene, polyphenylene oxide, polyphenylene sulfide, polyethylene glycol, polysulfurnitride, polyphenylene, polypyrrole, polyaniline, polythiophene, polypyridine, cellulose, starch, protein, epoxy resin, phenolic resin, derivatives thereof, crosslinks thereof, and copolymers thereof, wherein the conductive layer comprises one or more of a metallic material, a carbon-based conductive material, and a conductive polymer material;

the first protective layer comprises one or more of a metallic material, a metal oxide material, and conductive carbon, and the second protective layer comprises one or more of a metallic material, a metal oxide material, and conductive carbon, the first protective layer has a thickness $D_b$ that satisfies 1 nm≤$D_b$≤200 nm and $D_b$≤0.1$D_1$, and the second protective layer has a thickness $D_a$ satisfying 1 nm≤$D_a$≤200 nm and $D_a$≤0.1$D_1$.

10. A negative electrode plate for a lithium ion secondary battery, comprising:

a negative current collector; and a negative active material layer disposed on a surface of the negative current collector, wherein the negative current collector is a composite current collector, the composite current collector comprises a polymer-based support layer and a conductive layer disposed on at least one surface of the support layer, and the composite current collector has a thermal conductivity in a range of 0.01 W/(m·K) to 10 W/(m·K), preferably in a range of 0.1 W/(m·K) to 2 W/(m·K), wherein the composite current collector further comprises a first protective layer, and the first protective layer is disposed between the conductive layer and the support layer; and the composite current collector further comprises a second protective layer, and the second protective layer is disposed on the surface of the conductive layer facing away from the support layer; and wherein the second protective layer comprises:

a metal protective layer disposed on the surface of the conductive layer facing away from the support layer; and a metal oxide protective layer disposed on the surface of the metal protective layer facing away from the support layer, wherein the conductive layer has a thickness $D_1$ satisfying 300 nm≤$D_1$≤2 μm, and/or the support layer has a thickness $D_2$ satisfying 1 μm≤$D_2$≤15 μm, wherein the support layer comprises one or more of polyamide, polyimide, polyethylene terephthalate, polybutylene terephthalate, polyethylene naphthalate, polycarbonate, polyethylene, polypropylene, poly(propylene ethylene), acrylonitrile-butadiene-styrene copolymer, polyvinyl alcohol, polystyrene, polyvinyl chloride, polyvinylidene fluoride, polytetrafluoroethylene, poly(sodium styrenesulfonate), polyacetylene, silicone rubber, polyoxymethylene, polyphenylene oxide, polyphenylene sulfide, polyethylene glycol, polysulfurnitride, polyphenylene, polypyrrole, polyaniline, polythiophene, polypyridine, cellulose, starch, protein, epoxy resin, phenolic resin, derivatives thereof, crosslinks thereof, and copolymers thereof, wherein the conductive layer comprises one or more of a metallic material, a carbon-based conductive material, and a conductive polymer material;

the first protective layer comprises one or more of a metallic material, a metal oxide material, and conductive carbon, and the second protective layer comprises one or more of a metallic material, a metal oxide material, and conductive carbon, the first protective layer has a thickness $D_b$ that satisfies 1 nm≤$D_b$≤200 nm and $D_b$≤0.1$D_1$, and the second protective layer has a thickness $D_a$ satisfying 1 nm≤$D_a$≤200 nm and $D_a$≤0.1$D_1$.

11. An apparatus, including the lithium ion secondary battery according to claim 1.

* * * * *